Feb. 8, 1949.  R. DE VIRGILIS  2,461,315
ILLUMINATED MIRROR
Filed Jan. 25, 1946
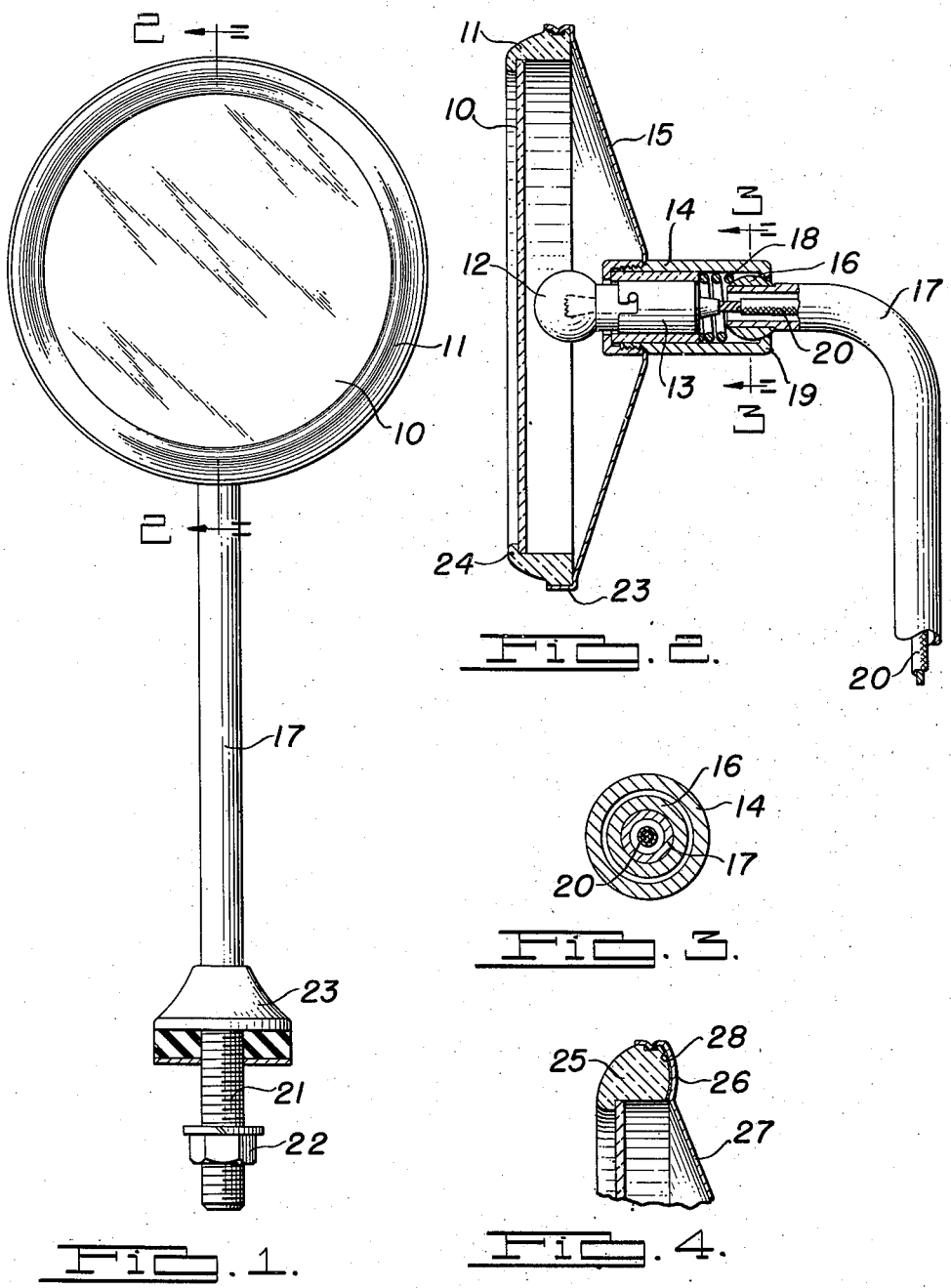
INVENTOR
Richard DeVirgilis
BY Louis Chayka
ATTORNEY Patented Feb. 8, 1949

2,461,315

UNITED STATES PATENT OFFICE 2,461,315

ILLUMINATED MIRROR

Richard De Virgilis, Detroit, Mich.

Application January 25, 1946, Serial No. 643,351

1 Claim. (Cl. 240—4.2)

The mirror is of the kind known as a rear view mirror for automotive vehicles and is intended to be mounted on the side of such vehicle so that the light thrown by the illuminated portion of the mirror may be visible from points rearwardly of the vehicle.

The specific purpose of my invention is to provide a mirror with an illuminating element in an assembly in which the mirror is held in place by said illuminated part, forming a frame for the support thereof.

Further advantages of my construction will be apparent from the description of my improvement. I shall now disclose the details of said construction with reference to the accompanying drawings, in which:

Fig. 1 is a front elevation of my illuminated mirror.

Fig. 2 is a sectional view on line 2—2 of Fig. 1.

Fig. 3 is a sectional view of a detail on line 3—3 of Fig. 2.

Fig. 4 is a sectional view of a modified rim of my illuminated mirror.

Similar numerals refer to similar parts throughout the several views.

The principal elements of my invention are a flat opaque mirror 10, a translucent rim 11 forming a frame for said mirror, and a source of illumination 12. While these elements have already been combined before, my improvement lies in the manner of their combination, especially in the relation of the translucent rim to the mirror and to the source of light, as will be set forth herein.

The source of light may be a simple bulb as shown, the bulb being located in socket 13, axially disposed in a bushing 14, which is connected centrally to a reflector 15. The outer end of the bushing accommodates a ball 16 forming a connecting member for a hollow stem 17 which serves as a support for the reflector. A coiled spring 18 within the bushing, but back of the socket, bears against the ball holding it in a yieldable, frictional abutment with an inwardly turned bead 19 at the outer end of said bushing. The ball and socket arrangement, which is already well known, makes it possible to adjust the mirror to any desired position. A wire 20 adapted to convey electric current to bulb 12, passes through the hollow stem from said bulb to a source of current within the body of the vehicle. As the details of the circuit are not a part of the invention, no further reference thereto seems necessary. The stem at its base is threaded, as shown at 21, and equipped with an annular member 23 and a removable nut 22 to aid in mounting the stem in a suitable bracket, it being understood that said member would be disposed on one side of the bracket while the nut would be applied against the other side thereof.

The reflector 15, which is preferably made of sheet metal, has the form of a shallow cone and includes at its outer rim a flange 23. The flange is intended to be clamped upon the outer edge of the translucent ring 11, which is to be made preferably of a suitable plastic, such as, for instance, "Lucite." A shoulder 24 projecting inwardly from the body of the ring serves as a retaining annular member for the flat faced mirror 10. The mirror is bonded around its circumference to said shoulder by a suitable cement or by suitable mechanical means. As the mirror is opaque, the light produced by the bulb 12 shows only through said translucent ring 11 and will be visible only on the mirror side of the device.

In Fig. 4, I am showing a modification of the translucent ring 25 and a modification of the marginal portion 26 of the reflector 27, said marginal portion being in cross-section, concave and silvered to act as a reflecting unit of its own. The silver coating on said marginal portion 26 is indicated by numeral 28.

I wish to point out that in both cases, that is, in case of the mirror shown in Fig. 2 and in the modified structure illustrated in Fig. 4, the mirror is in a plane spaced from the marginal portion of the reflector and that the translucent ring is interposed between the plane of the marginal rim of the reflector and the plane of the mirror plate so that the light from the bulb back of the mirror plate may be seen from the side of the assembly and from the direction facing the mirror. The side illumination serves as a warning light indicating the presence of the automobile on the road. This feature for the purpose of diffusing light sideways is a novel feature of construction which I wish to stress, presenting therefore the following claim.

I claim:

In an illuminated mirror, including a concave reflector, a source of light centrally located therein, an opaque mirror in front of the source of light, a translucent member framing the mirror and interposed between the plane of said mirror and the plane of marginal portion of the reflector for transmission of light sideways, said marginal portion being curved inwardly and silvered for reflection of light through the body of said translucent member in the direction facing said mirror.

RICHARD DE VIRGILIS.

REFERENCES CITED

The following references are of record in the file of this patent:

UNITED STATES PATENTS

| Number | Name | Date |
|---|---|---|
| 1,138,552 | Goddard | May 4, 1915 |
| 2,253,952 | Desimone | Aug. 26, 1941 |
| 2,295,176 | Kelly | Sept. 8, 1942 |

FOREIGN PATENTS

| Number | Country | Date |
|---|---|---|
| 707,793 | France | Apr. 20, 1931 |